June 10, 1930.    J. GLUCK    1,762,862
TAXIMETER
Filed Nov. 17, 1921    10 Sheets-Sheet 1

Inventor
Julius Gluck,

WITNESSES:-

June 10, 1930.  J. GLUCK  1,762,862
TAXIMETER
Filed Nov. 17, 1921  10 Sheets-Sheet 3
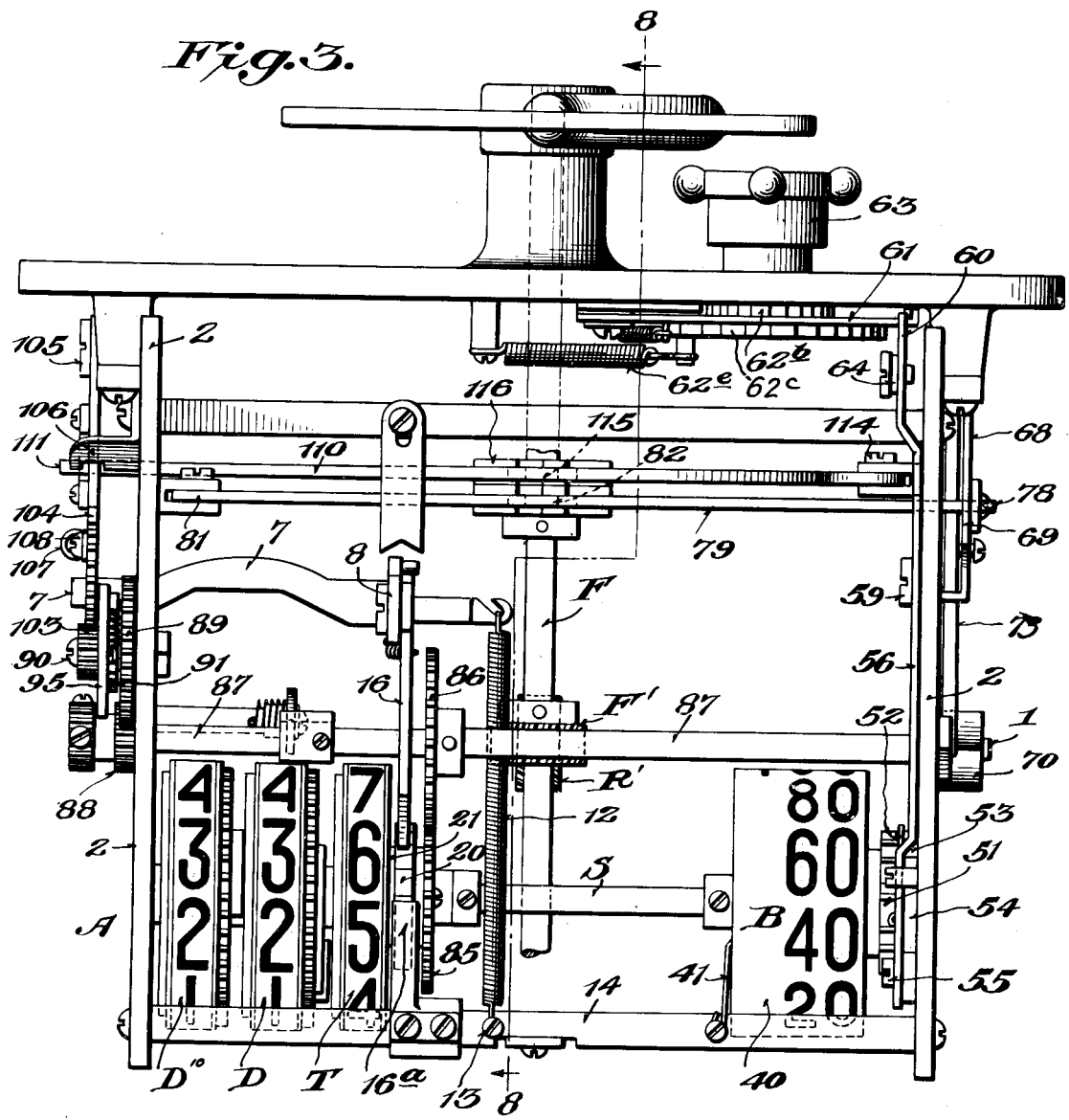
Fig. 3.
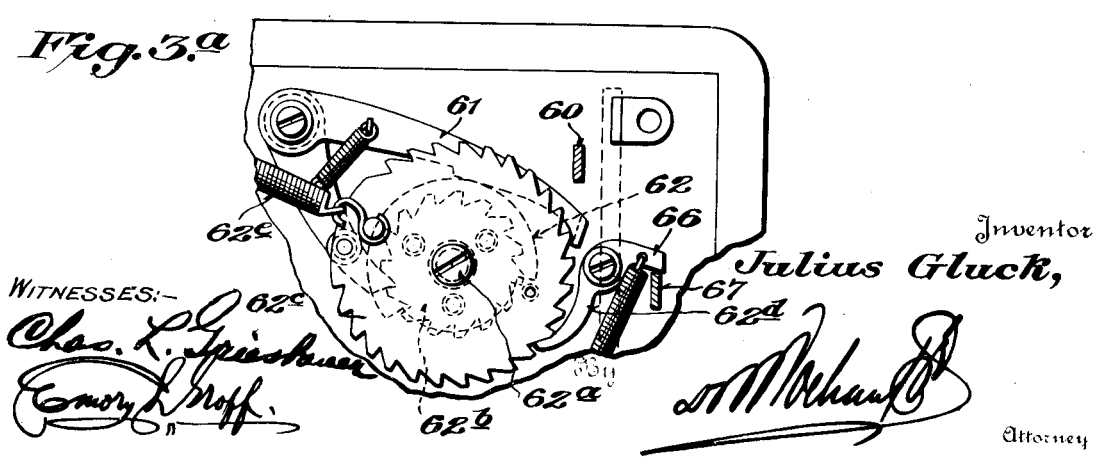
Fig. 3.ª
WITNESSES:  Inventor
Julius Gluck,
Attorney June 10, 1930.  J. GLUCK  1,762,862
TAXIMETER
Filed Nov. 17, 1921   10 Sheets-Sheet 5

WITNESSES:—

Inventor
Julius Gluck,

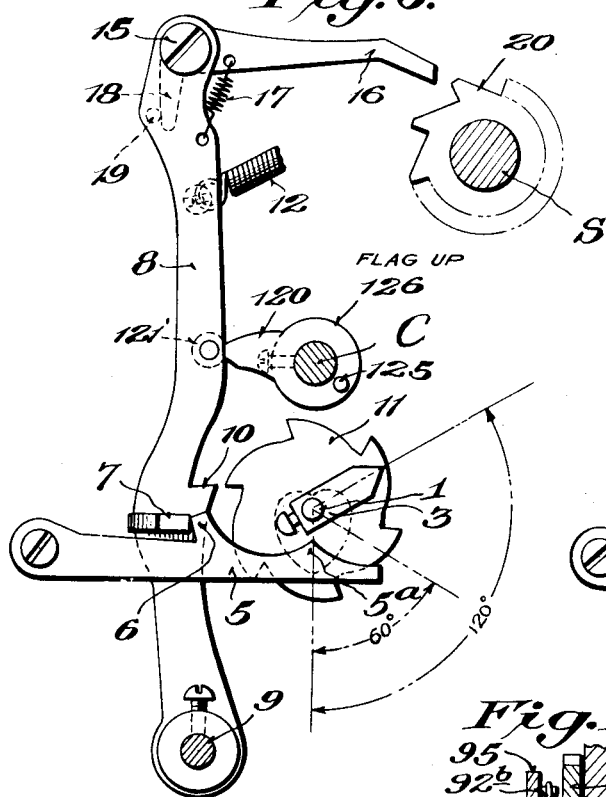
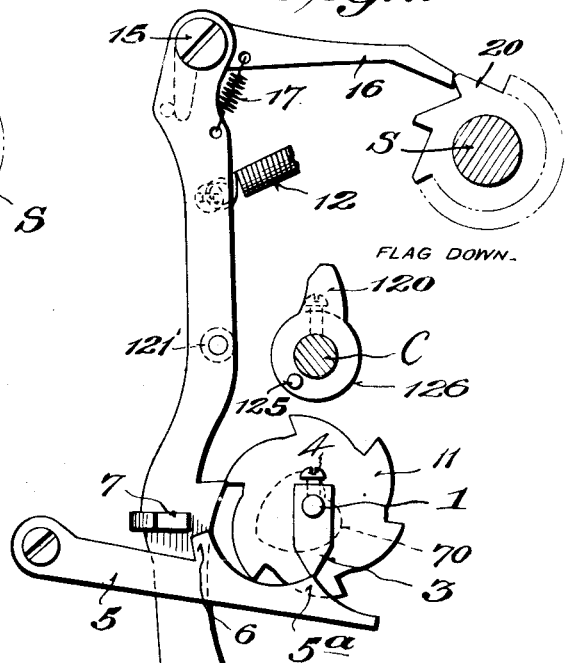
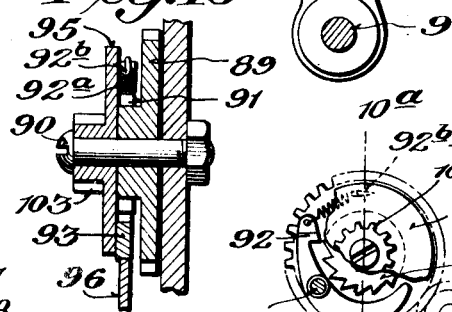
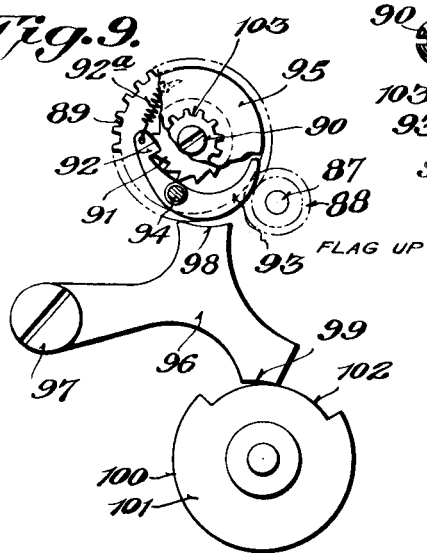
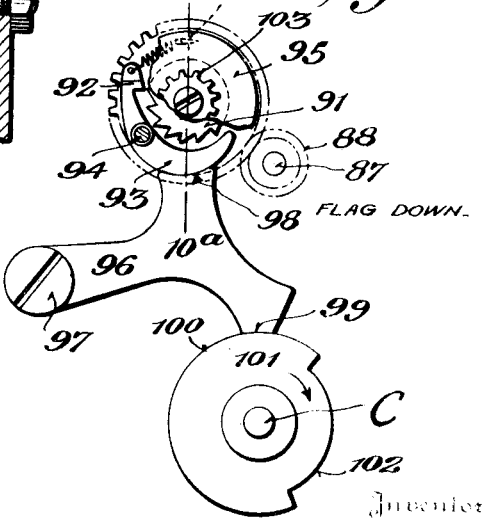

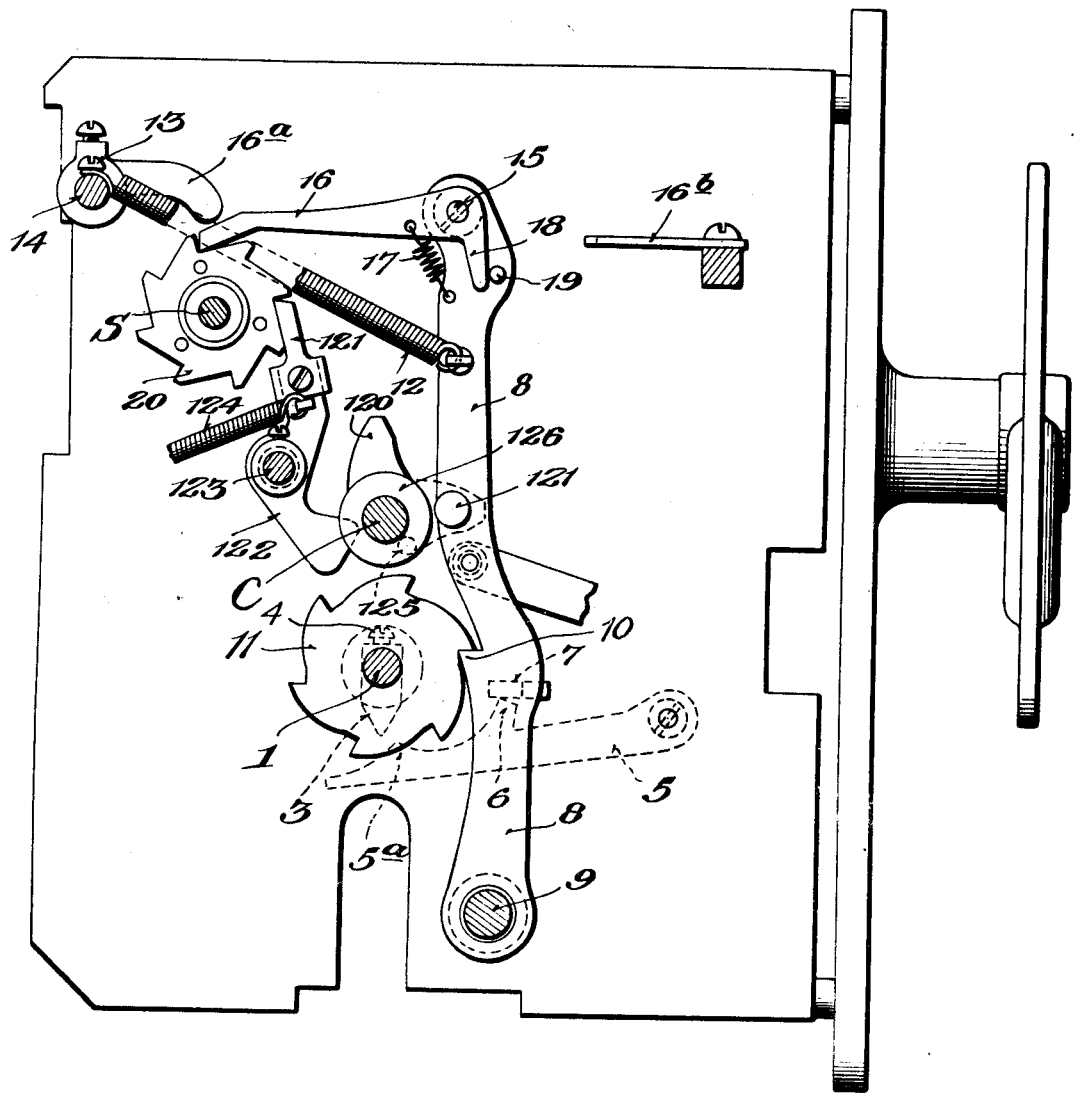

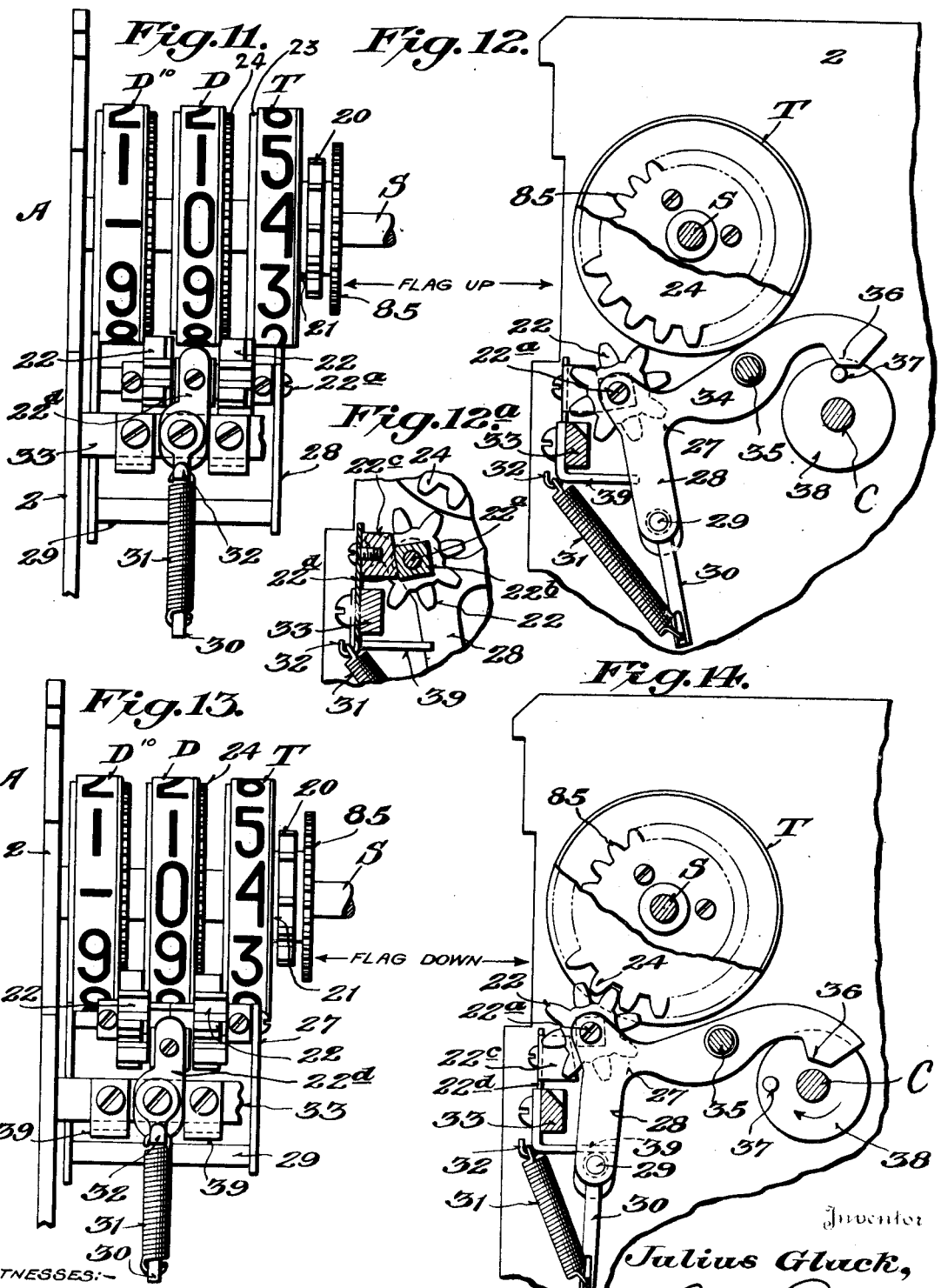

June 10, 1930.　　　　　J. GLUCK　　　　　1,762,862
TAXIMETER
Filed Nov. 17, 1921　　10 Sheets-Sheet
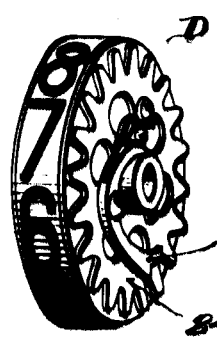
Fig.16.
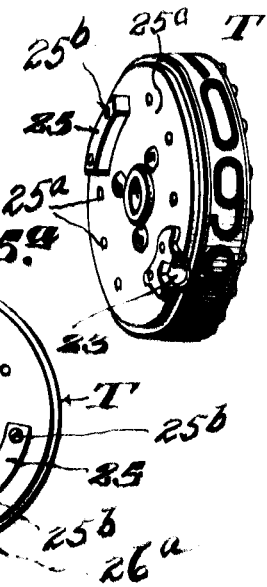
Fig.15.
Fig.15ª
Fig.17.
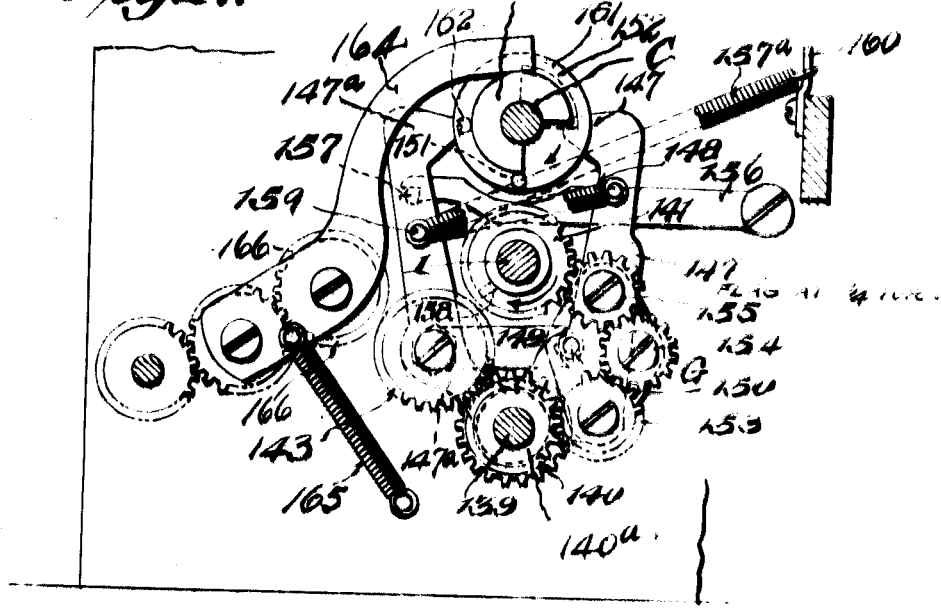
Inventor
Julius Gluck, June 10, 1930.  J. GLUCK  1,762,862
TAXIMETER
Filed Nov. 17, 1921  10 Sheets-Sheet 10
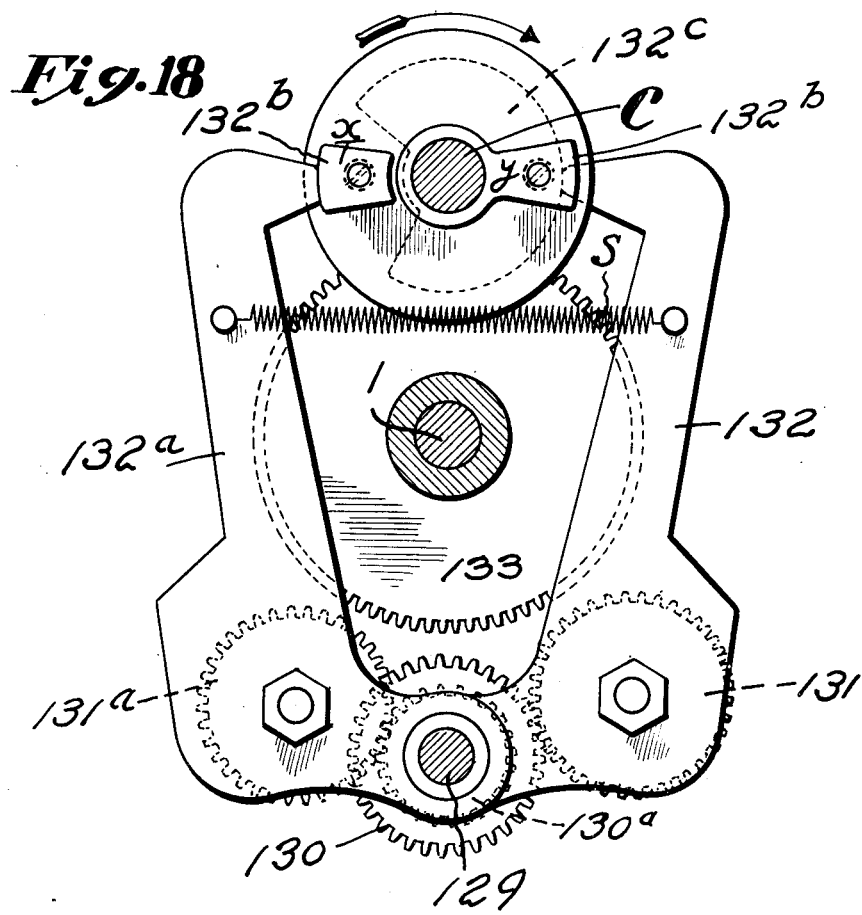
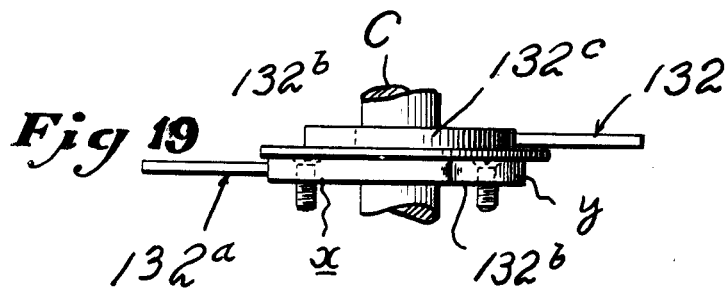
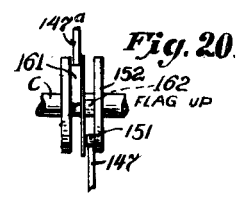
JULIUS GLUCK
INVENTOR Patented June 10, 1930

1,762,862

UNITED STATES PATENT OFFICE

JULIUS GLUCK, OF NEW YORK, N. Y., ASSIGNOR, BY MESNE ASSIGNMENTS, TO OHMER FARE REGISTER COMPANY, OF DAYTON, OHIO, A CORPORATION OF NEW YORK

TAXIMETER

Application filed November 17, 1921. Serial No. 515,920.

This invention relates to an improvement in fare registering taximeters of the type used on cabs or other vehicles for hire.

A primary object of the invention is to provide a practical and simple construction whereby the meter may be adapted to different initial charge rates according to tariffs in effect in different places of use, thereby enabling the meter structure to be made on a standardized basis and requiring only the proper adjusting and setting of certain instrumentalities thereof to obtain the desired registrations. That is to say, it is proposed to provide means for increasing or diminishing the value received in distance traveled or waiting time, for the amount of the initial-charge, by maintaining the register drums inoperative for a greater or less period while the amount of the initial-charge is being consumed. To that end the apparatus is constructed to meet the requirements of a minimum initial fee and by setting the proper parts higher initial fees may be readily calculated.

Another object of the invention is to provide novel means for quickly resetting the fare drums to their initial position, including novel means for disengaging the transfer pinions prior to the returning of the register drums to initial position by the resetting mechanism.

A further object of the invention is to provide means whereby the time mechanism may restrain the operation of the fare drums to give a longer period of waiting time for the initial-charge than would otherwise be possible if the time mechanism operated the fare drums directly through the speed actuated instrumentalities.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings in which—

Figure 3 is a top plan view thereof.

Figure 3ª is a detail view of the "Extras" drum operating means.

Figure 1:
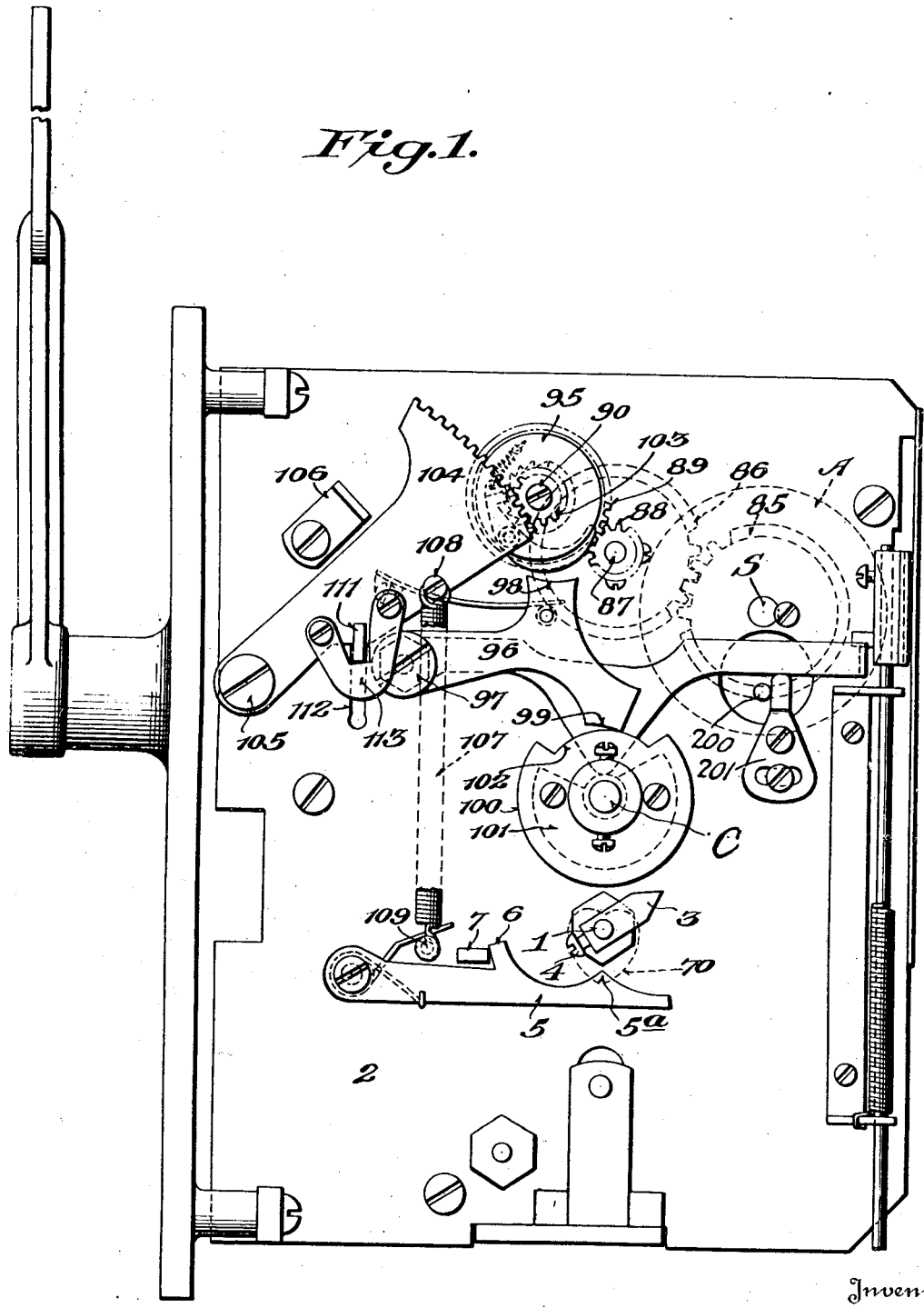
Figure 1 is a side elevation of the improved taximeter with the casing removed.
Figure 4:
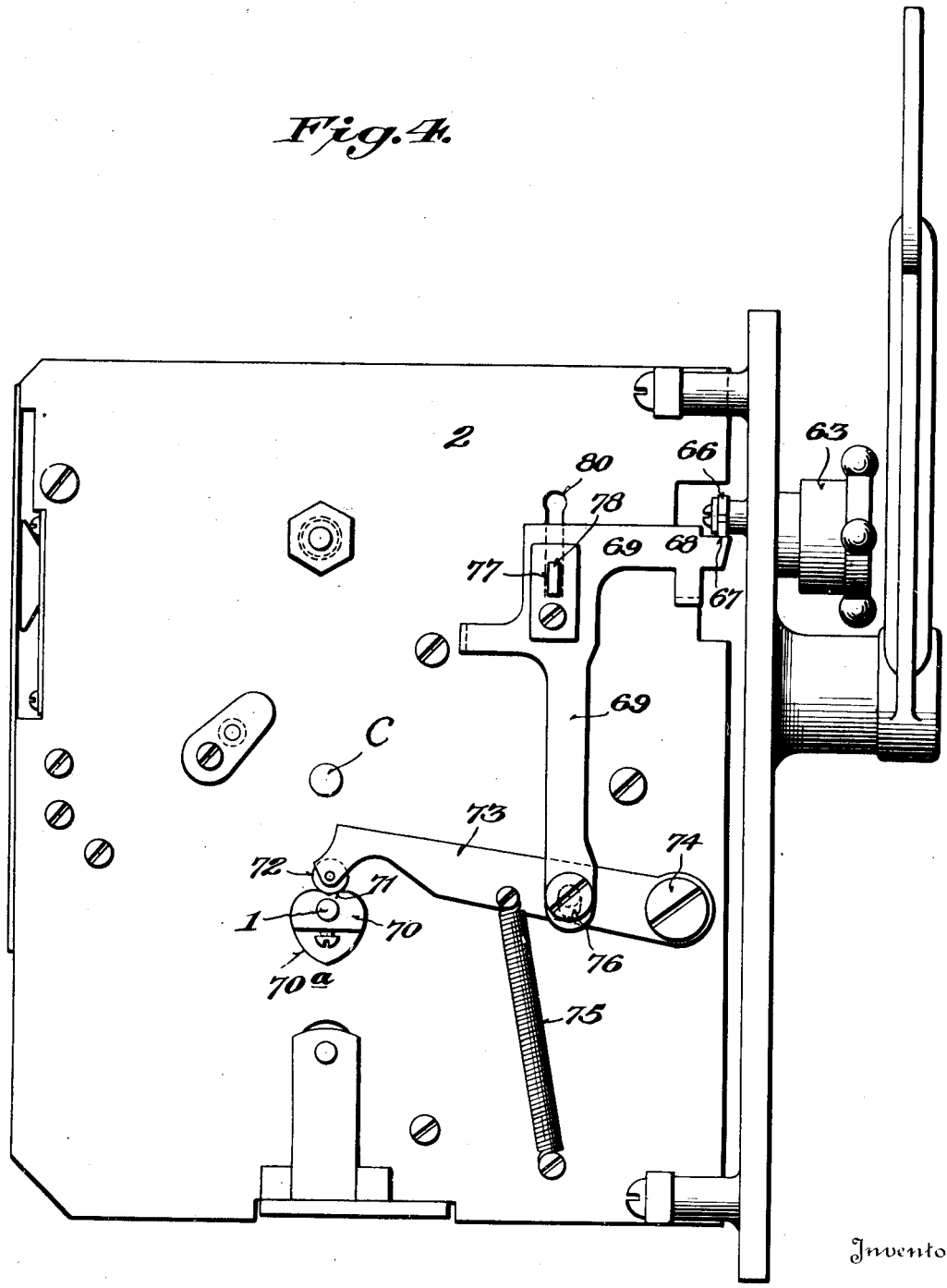

Figure 4 is a side elevation of the side of the meter opposite to that shown in Figure 1.

Figure 2:
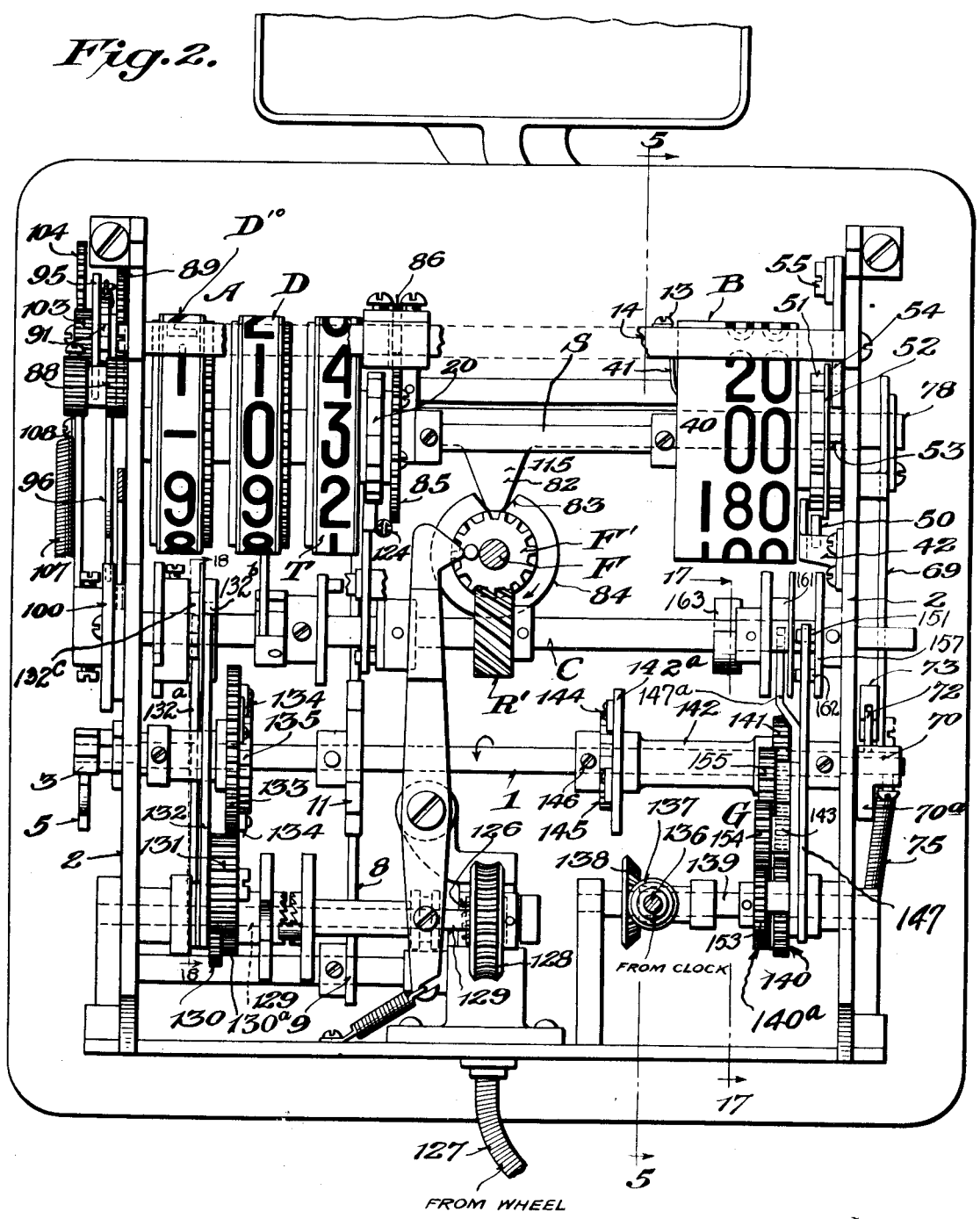
Figure 2 is a front elevation of the construction shown in Figure 1.
Figure 5:
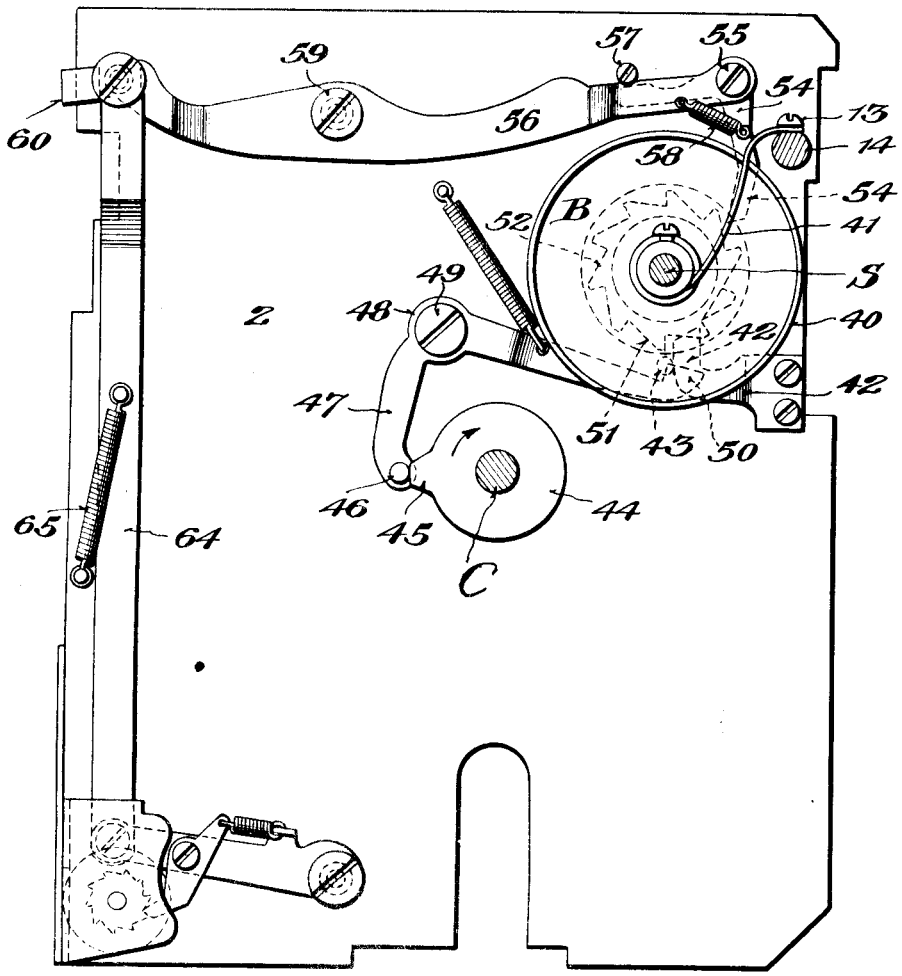

Figure 5 is a vertical sectional view taken on the line 5—5 of Figure 2, and looking toward the "Extras" drum.

Figure 6 is a detail view showing the relative position of the initial-charge detent and the fare drum registering mechanism when the flag is up or in "Vacant" position.

Figure 7 is a detail view similar to Figure 6 showing the relative position of the parts when the flag is down in one of the tariff positions and the meter is operating.

Figure 8 is a vertical sectional view of the fare drum operating mechanism taken on the line 8—8 of Figure 3, the parts not directly relating to the fare drum operating mechanism being omitted for the sake of clearness.

Figure 9 is a detail view of a clutch unit of the fare drum resetting mechanism when the flag is up or in "Vacant" position.

Figure 10 is a view similar to Figure 8 when the flag is down and the meter is operating.

Figure 10ª is a detail sectional view taken on the line 10ª—10ª of Figure 10.

Figure 11 is a detail front elevation of the fare drum register unit showing the position of the fare drums and of the transfer pinions when the flag is up or in "Vacant" position.

Figure 12 is a detail vertical sectional view showing the construction of Figure 11 in side elevation.

Figure 12ª is a detail sectional view of the transfer pinion assembly.

Figures 13 and 14 are views similar to Figures 11 and 12 showing the relative position of the fare drums and transfer pinions when the flag is down and the meter is registering.

Figure 15 is a perspective view of the dollar drum showing its transfer side.

Figure 15a is a detail view illustrating the adjustable stop feature of the fare drums.

Figure 16 is a perspective view of the dollar drum showing its driving side.

Figure 17 is a vertical sectional view taken on the line 17—17 of Figure 1, except that the drum has been turned to the first tariff position and showing the means for connecting the clock mechanism with the main operating shaft.

Figure 18 is an enlarged sectional view taken on line 18—18 of Fig. 2 looking in the direction of the arrows.

Figure 19 is a detail top plan view of the cam unit controlling the single and double tariff levers or shears.

Figure 20 is a detail plan view of the cams controlling the levers carrying the gear trains operated by the clock mechanism.

Similar reference characters designate corresponding parts throughout the several figures of the drawings.

In carrying the present invention into effect, it is proposed as previously indicated to provide a relatively simple arrangement of instrumentalities whose features of novelty center about a fare register unit and a practical and reliable arrangement for adjusting and setting the operating mechanism therefor in such a manner as to vary the unit of mileage covered by the initial-charge.

The initial-charge, as well as the distance traveled, or the period of waiting time for the initial-charge may vary in different places as for example it may be 30¢ for the first half mile in one city and 40¢ or 50¢ for the same distance in other cities, or, any of these rates may prevail for greater distances, and it is the purpose of the present construction to provide a meter to meet these different conditions of use by adjusting the proper instrumentalities to render the register drums inactive until the initial fare charge is consumed by traveling or waiting.

Also the invention contemplates a novel resetting unit for returning the main operating shaft to its initial position, while at the same time returning the fare register drums to their initial position, as will hereinafter more fully appear in detail.

Primarily, therefore, the novel and distinctive features of the present invention reside in the fare register unit and the instrumentalities directly involved in operating the same to give the desired fare indications and subsequently returning the same to the starting point.

Referring first to the general organization and arrangement of parts involved, it will be observed that the main operating shaft 1 may be suitably journaled in the opposite side walls 2—2 of the meter, and according to the usual practice may be driven by the movement of the vehicle or by a conventional type of clock-work (not shown) in the direction of the arrow shown in Figure 2.

At one end of the said shaft 1 is an initial-charge controlling detent 3 which may be in the form of an offset finger or like radial projection adjustably held to the shaft by the set screw 4. This initial-charge controlling detent 3 is adapted to cooperate with a restraining lever 5 in such a way that as long as the abutment 6 of the restraining lever lies in the path of the arm 7 of the fare drum operating lever 8, the said fare drums can not be operated. Thus, it will be apparent that until the detent 3 moves through a sufficient arc to shift the restraining lever 5 and withdraw the abutment 6 from the path of movement of the arm 7, the fare drums will not register and the initial charge appearing on the face of the meter will still be visible.

Therefore, if the detent 3 is set to different angular positions on the main operating shaft more or less time will be required to cause the same to pass through the required arc before it engages the restraining lever 5, and in that way the distance traveled and period of time for which the initial charge is made, may be varied to suit the desired tariff rates. For example in Figure 1, the detent 3 is shown as being set at an angle of 120° from the vertical line passing through the tip of the shoulder 5a and the center of the shaft 1 and, assuming that the initial charge is 30¢ for the first quarter mile or the equivalent in minutes waiting time, the detent 3 will travel through an arc of 120° before it engages the trip shoulder 5a and depresses the lever 5 sufficiently to drop the shoulder 6 beneath the arm 7 to permit the actuation of the fare drum operating lever 8. When the detent 3 is set in the said position, the passenger would be charged the same amount for the first quarter of a mile as he would be charged for each succeeding quarter of a mile or other unit of distance. If, however, the initial rate should be double the rate for succeeding like fractions of a mile, the detent 3 would be set 60° from the shoulder 5a to thus cause the main operating shaft to move through an arc of 60° before it effects the release of the fare drums operating means. Likewise the detent 3 may be set at other angles if desired to give a longer or shorter distance traveled for the initial charge.

Briefly, the setting of the initial charge finger 3 may be expressed by the statement that when the rate of the meter is such that the initial mileage is equal to the unit of subsequent mileage, the finger 3 is in the position shown, which is 120° from the shoulder 5ª, while if the initial charge is twice the subsequent charge for the same unit of mileage, the finger must be set at 60° from the shoulder 5ª. This feature enables the present meter construction to be adjusted to vary the initial mileage by simply varying the setting of the finger 3.

The main fare register unit is designated generally as A and preferably includes for example a cents drum T that may operate in conjunction with a numeral or other character (not shown) on the face plate of the meter, a dollar drum D, and a ten dollar drum $D^{10}$. It will of course be understood that other fare units than dollars and cents may be carried on the fare drums. That is to say, the cents drum may show units of 5¢ or units of 10¢ and, if necessary, might also show pence-shillings-pounds. These drums are automatically operated and are arranged in a group at one side of the meter frame. As shown in Figure 2, they may be supported by the shaft S which also carries at the opposite side of the frame an "Extras" register unit B consisting of a single drum having thereon the desired numerals from the minimum to the maximum amount of "Extras" to be taxed under the prevailing tariff. This "Extras" unit B is manually operated by the operator of the vehicle entirely independent of the movement of the vehicle or the clock-work, as will hereinafter more fully appear.

The main fare register unit A, which is operated automatically by the movement of the vehicle or clock-work, is actuated by the main operating shaft 1 through the medium of the lever 8 which is pivotally supported at its lower end, as indicated at 9, and provided at its intermediate portion with a shoulder 10 adapted to be engaged and released by the teeth of the ratchet or star wheel 11 carried upon the main shaft in such a manner as to rock or oscillate the lever on the pivot 9. The star wheel 11, and the shaft 1 on which it is mounted, together with the detent 3 constitute what may be termed a star wheel unit which controls the operation of the counter actuating lever 8 as well as the operation of the restraining lever 5. For the purpose of compelling the lever 8 to follow the teeth of the ratchet or star wheel 11, a suitable spring 12 may be employed, the same being attached to the lever at any suitable and convenient point while the other end thereof is fastened or anchored as at 13 to the rod or frame part 14. (See Figure 8.) The upper end of the lever 8 has pivotally secured thereto as at 15 an operating pawl 16, the same being tensioned by the spring 17 and held in its proper operating position by the aid of the stop arm 18 formed therewith and the stud or abutment 19 on the lever.

The front end of the pawl 16 is adapted to engage with a ratchet wheel 20 carried by the 10¢ drum T of the main fare register unit, and it will therefore be apparent that upon each reciprocation of the lever 8 the fare drum ratchet 20 will be advanced the distance of one tooth through the medium of the pawl 16. Thus, if the 10¢ drum T is originally set to indicate an initial charge of 30¢, the first actuation of the lever 8 by the main operating shaft 1 will cause the 10¢ drum T to rotate the distance of one tooth and exhibit the numeral 4 to indicate a charge of 40¢. In connection with the operating strokes of the pawl 16, it may be observed from Figure 8 that the free end of the pawl which engages the ratchet is prevented from slipping out of engagement with the ratchet teeth by the guard 16ª which overlies the ratchet and operating end of the pawl, also the backward movement of the lever 8 is limited by abutment 16ᵇ.

With the arrangement described, it will be apparent that the main fare register unit A is positively and reliably operated from the main shaft 1 by the cam wheel 11 and lever 8, regardless of whether the main shaft is distance or time driven, after the initial-charge detent 3 has moved the restraining lever to position to permit the abutment 6 to clear the arm 7.

Referring now more in detail to the main fare register unit A, it will be observed that the ratchet wheel 20 is carried by the hub 21 of the 10¢ drum T which is loosely mounted on the shaft S. Therefore, when the pawl 16 is actuated the 10¢ drum T may be moved intermittently to give the desired indication. When the drum T has been rotated to bring the numeral 9 into view, it will be necessary to lock the same to the dollar drum D thereby to bring the dollar unit into action. And, to effect the desired coupling of the 10¢ and dollar drums T and D respectively a novel transfer unit may be employed.

While the said unit employs the star wheels 22 of conventional design for cooperating with the star wheel actuator 23 on the drum of low value and with the gear 24 on the adjacent drum of higher value, nevertheless, the particular manner in which the star wheels are mounted and carried, constitute one of the novel and distinctive features of the present invention. That is to say, when the flag is up and the meter is not operating, as when the vehicle is "Vacant" the transfer unit occupies the position shown in Figures 11 and 12 of the drawings, from which it will be observed that the entire unit is lowered to such a position that the star wheels 22 are clear or free of the cycle of the star wheel actuator 23 and gear 24.

One of the novel and distinctive features of the main fare register unit resides in the means provided for returning the fare drums to their original position as well as providing simple and practical means for setting the drum of lowest value to vary the initial tariff charge. That is to say, on the side of each fare drum having the star wheel actuator, is arranged a suitable stop abutment 25 for cooperating with the pawl 26 on the side of the adjacent drum of higher value carrying the transfer gear 24. The pawl 26 is spring-pressed and pivotally supported in such a manner that the stop 25 will trail over the abutment end 26$^a$ thereof during the registering operation to permit the usual transfer action to be accomplished, but when the drums are to be reset the stop 25 will engage with the said abutment end of the pawl to thereby lock the adjacent drums together and carry them back to their original position. The drum of highest denomination is provided with a pin 200 which engages a stop 201 secured to the sidewall 2 of the meter. With this arrangement the drums are returned to their original set positions in the reverse order to that in which they are propelled forward during the registering operation and are arrested in their reset position by the pin 200 engaging the stop 201.

In connection with the drum of lowest value, in the present example the 10¢ drum T, it will be noted that the stop 25 thereof is adjustable which is an important feature in the functioning of the unit since it permits of readily adjusting the initial tariff to any rate desired. For example if the initial charge is 30¢ the stop 25 on the drum T is positioned adjacent the numeral "2" so that each time the drums are reset, the stop 25 will abut against the end 26$^a$ of the pawl 26 carried by the drum D, thereby causing the numeral "3" to be visible on the face of the meter. However, should the initial charge be 40¢, this situation may be readily met by simply removing the stop from the position it occupies in Figure 15$^a$, for example, and securing the same at the position of the openings in the wall of the drum T adjacent the numeral "3." Thus, the stop 25 when abutting with the end 26$^a$ of the pawl 26 will cause the numeral "4" to always register on the face of the meter at the end of each resetting operation. By adjusting the stop 25 to other positions on the side of the drum additional changes in the initial tariff may be effected. For convenience in effecting the adjustment the side wall of the drum may be provided with openings 25$^a$ for receiving the fastening 25$^b$ which secures the stop to the drum.

Accordingly, it will be apparent that the amount of the initial tariff appearing on the face of the meter may be readily varied by the present construction thereby enabling the present device to cover a wide range of initial fare charges to suit various users.

Again referring to the transfer unit which includes the star wheels 22 it may be observed that the said unit preferably includes in its organization a swinging carrier frame consisting of the angular side members 27 having their arms 28 connected by a brace 29 provided with an offset projection 30 which has secured thereto one end of a spring 31 whose opposite end is connected as at 32 to a stationary hook carried by the bar 33 of the meter frame. The other arms 34 of the side frame member 27 are pivotally supported upon a spindle 35 and are formed at their ends with a cam projection 36 adapted to cooperate with a stud 37 carried by disc 38 mounted on the cam shaft C of the meter. This construction provides a swinging mounting for the carrier for the star wheels 22 arranged upon the supporting shaft 22$^a$ located at the corner of the angle formed between the arms 28 and 34 of the side frame members 27. At this point it may be noted that the star wheels 22 are maintained in the position shown in Figures 11 and 12 all the while the flag is up and the meter mechanism is in inoperative condition. However, as soon as the flag is pulled down the movement of the flag shaft F will cause a movement of the cam shaft C to cause the stud 37 to release the cam end 36 of each of the arms 34 to permit the spring 31 to contract and rock the star wheel carrying frame on the pivot 35 to thus cause the star wheels to move to an operative position with respect to the star wheel actuators 23 and gears 24 of the fare drums, as shown in Figures 13 and 14. Obviously, to permit the star wheels to freely rotate the effect the transfer or pickup of one drum by the other, when the flag is down and the meter is operating, the same must be mounted to freely rotate on the supporting shaft 22$^a$. And, on the other hand, to insure that the said star wheels may be held in correct position while out of mesh with the drums, as shown in Figures 11, 12 and 12$^a$, to insure the proper re-engagement with the gears 24 thereof when the flag is again pulled down to start the operation of the meter, novel means is employed.

In connection with the novel means for causing the star wheels 22 to be held against accidental promiscuous rotation on the shaft 22$^a$ which would prevent proper engagement of the star wheels with the gears of the fare drums, it may be observed from Figure 12$^a$ that each star wheel is formed with a square hub portion 22$^b$ for cooperating with the keeper member 22$^c$ which may be resiliently mounted or carried by a relatively yielding supporting member 22$^d$. When the star wheels 22 are in mesh with the gears 24, as shown in Figures 13 and 14, the square hubs 22$^b$ thereof are of course out of engagement with the keeper 22$^c$, but, when the star wheel carrier frame is swung or rocked under the influence of the movement of the cam shaft C to draw the star wheels out of mesh with the gears 24, the square hubs 22$^b$ will slidably engage with the face of the keeper 22$^c$ and thus prevent the star wheels from rotating or spinning while they are free or out of mesh with the gears.

It will be noted that the teeth of each of the star wheels 22 are alternately recessed so that every other tooth extends throughout the width of its star wheel, while the intervening teeth extend from one side thereof to a point short of the opposite side thereof. All of these teeth with the teeth of the gear 24 when the parts are in position in Figs. 13 and 14. The long teeth project over the periphery of the disc 25$^c$ effectively preventing the accidental rotation of the star wheel 22 and the gear 24. The short tooth between the two long teeth nearest the disc 25$^c$ extends below the periphery of the disc 25$^c$, as is shown in Fig. 13. When, therefore, one of the teeth of the star wheel actuator 23 reaches the said short tooth, the star wheel 22 is partially rotated, the adjacent long tooth passing into the valley between the two teeth of the star wheel actuator 23, the succeeding short tooth being carried below the periphery on the disc 25$^c$ and the following long tooth being brought adjacent the said periphery. Since the star wheel actuator 23 has now passed out of mesh with all of the teeth of the star wheel 22, there would be nothing to rotate the star wheel. However, the disc 25$^c$, projecting between adjacent long teeth, positively holds the star wheel against any possible tendency to rotate on account of jostling or accidental cause.

Upon the release of the carrier frame by the cam shaft C, as when the meter is again set in operation, and the spring 31 exerts its influence to shift the star wheels back into engagement with the gears 24 the said star wheels will be properly set to mesh with the teeth of the gears without danger of jamming or improperly meshing therewith. In connection with the function of the spring 31 to cause the shifting of the carrier for the star wheels, it may be noted that in order to relieve the star wheels from engaging with the gears 24 under pressure as would be the case if the tension of the spring were permitted to exert its influence between the star wheels and the gears, suitable stops or abutments 39 are provided to engage the brace 29.

With the arrangement above described it will be apparent that the manner in which the star wheels for the fare register drums are manipulated contributes materially to the accuracy and reliability of the functioning of the fare drums of the main fare register unit A. The fare drums of the main register unit are of course automatically operated by the instrumentalities described to give the desired fare indication, and, as hereinafter will more fully appear, are automatically reset by manipulating the flag shaft F, and by withdrawing the star wheels from the drum gears the resetting operation is greatly facilitated. However, before proceeding to a description of the resetting instrumentalities involved in restoring the drums to initial position, the "Extras" fare unit B will be briefly described.

As previously indicated this unit is operated manually by the driver of the vehicle and consists of a single drum 40 mounted upon the shaft S and adapted to be operated against the tension of the spring 41 operating in conjunction with a stop abutment 42 carried by the meter frame and a stop projection 43 carried by the side of the drum 40 (Figure 5). When the flag is in "Vacant" position the drum 40 is disconnected from all of its operating instrumentalities and the tension of the spring 41 holds the drum in its initial zero position by maintaining the projection 43 in engagement with the stop 42.

However, as soon as the flag is moved from its "Up" or "Vacant" position the cam shaft C is turned so that the disc 44 carried thereby and having the offset cam portion 45, is removed from engagement with the pin 46 carried by the arm 47 of the check pawl 48. This check pawl is pivoted to one of the sides 2 of the meter, as indicated at 49, and has its detent end 50 positioned to engage with the teeth 51 of one side of a double ratchet wheel 52 which is carried with the drum 40 between the end wall of the drum and the meter casing 2. (See Figure 2.) The purpose of the detent end 50 of the check pawl engaging with the teeth 51 of the ratchet wheel 52 is to prevent backward rotation of the drum 40 under the influence of the spring 41 after the drum has been operated to give the proper indication of the amount of "Extras" to be collected from the passenger. At the proper time however in the resetting operation, the detent 50 is disengaged from the ratchet 52 to permit the drum to rotate under the influence of the spring until the projection 43 again engages abutment 42.

Referring now to the manner of operating the "Extras" drum it may be observed that the ratchet wheel 52 is provided with a second series of ratchet teeth 53 adapted to be engaged by an operating pawl 54 pivotally carried as at 55 by a lever 56 and yieldingly held against the stop 57 carried by the wall 2 of the meter casing by means of the spring 58 (see Figures 2, 3 and 5). The lever 56 is pivoted as at 59 to the side of the meter casing, and the end 60 thereof is adapted to be engaged by the trigger arm 61 of a manually actuated operating unit which is more clearly shown in Figures 3 and 3$^a$ of the drawings.

This operating unit comprises in its organization a cam 62 for engaging with the trigger lever 61 each time the operator's knob 63 is turned through a complete circle. The said cam 62, as well as the operator's knob 63, are carried upon a common shaft 62$^a$, and as may be observed more especially from Figure 3, the said shaft 62$^a$ carries a check-disc 62$^b$ and an operating wheel 62$^c$ having a toothed periphery adapted to be engaged by a pawl 62$^d$. The said actuating wheel 62$^c$ has a spring 62$^e$ connected therewith at a point radial to its axis, so that when the said wheel is turned in a counterclockwise direction, looking at Figure 3$^a$, the spring will be stretched until its point of attachment with the wheel passes by a position 180° from the normal position shown in Figure 3$^a$. As soon as the wheel passes the 180° point the spring will quickly rotate or snap the entire unit which will have the effect of causing the cam 62 to kick the trigger 61 upwardly with sufficient force to cause it to trip the lever 60 and thus actuate the lever 56 which in turn actuates the drum 40 through the pawl 54. It requires one complete cycle of the operator's knob 63 to move the drum 40 the distance of one tooth and thereby register an additional amount of 10¢ on the portion of the drum which is visible on the face of the meter.

The lever 56 adjacent the end 60 thereof may be provided with suitable operating connections 64 for actuating a counter or totalizer for accumulating the amount of "Extras" registered by the meter. This connection 64 is preferably tensioned by the spring 65 and by reason of the connection between the lever 56 and the part 64 the said spring 65 will also tension the lever 56 and maintain the same normally against the stop 57, thus maintaining the pawl 54 elevated except when the same is forced downwardly by the striking of the end 60 of the lever by the trigger element 61.

When the flag is in "Vacant" position the arrangement is such that the knob 63 cannot be manipulated. That is to say, when the flag is in an upright position to indicate that the meter is vacant, the locking pawl 62$^d$ is engaged with the teeth of the wheel 62$^c$ thereby to restrain the operation of the cam 62, but when the flag is turned downwardly to set the meter into operation the tail portion 66 of the pawl 62$^d$ is engaged by the upward movement of the trip nose 67 carried by the arm 68 (see Figures 3$^a$ and 4) of a releasing member 69 which is controlled by the flag shaft F, in a manner which will hereinafter more fully appear in connection with the description of the resetting mechanism for the main operating shaft 1.

Having now described the novel instrumentalities and combination of parts involved in operating the main fare register A and the "Extras" fare register B, the resetting mechanism for returning the main operating shaft 1, as well as the fare drums to initial position, will be described.

Referring first to the main operating shaft 1 is will be observed that the end thereof opposite the initial-charge controlling detent 3 may be provided with a substantially heart-shaped cam 70, the valley 71 of which is adapted to be engaged by a roller 72 when the flag is up or in "Vacant" position. This roller 72 is mounted on a carrier lever 73 pivoted as at 74 to the frame of the meter and engaged by spring 75 thereby to yieldingly hold the roller 72 in the valley 71 of the cam and to also cause the said roller to engage with the periphery 70$^a$ of the cam during the resetting operation to thus force the main operating shaft 1 back to its initial position.

For the purpose of withdrawing the roller 72 clear of the heart-shaped cam 70 to permit the free operation of the shaft 1 when the flag is down the said lever 73 which carries the roller 72 is pivotally connected, as at 76, with the releasing member 69, which as previously explained, carries the part 67 which releases the pawl 62$^d$ that acts as a check upon the "Extras" operating handle 63 when the flag is up and the meter is idle. As will be observed from Figure 4 the said releasing member 69 is provided at its upper end with a slot 77 for receiving the movable end 78 of an elevating arm 79 which is slidably guided in the slot 80 of the meter wall 2 while the opposite end of said arm is pivotally supported as at 81 to the opposite wall 2 of the meter frame (see Figure 3). The intermediate portion of the elevating or lifting arm 79 has a downwardly projecting tooth 82, as will be observed from Figure 2, which is adapted to sit in the valley 83 of an actuating cam 84 when the flag is in its upright or vertical position and ride on the periphery of said cam when the flag is manipulated to rotate the flag shaft F in the direction of the arrow shown in Figure 2 to thereby lift or elevate the arm and cause the end 78 thereof to raise the releasing member 69 which accomplishes the result of releasing the main operating shaft by disengaging the roller 72 from the valley of the heart-shaped cam 70 and also releasing the "Extras" fare operating knob 63 by actuating the dog 66.

Thus, in the movement of the flag from its upright "Vacant" position downward into one of the tariff positions, the flag shaft F causes the release of the main operating shaft by disengaging the resetting and holding elements 72, from the heart-shaped cam 70 and also unlocks the "Extras" operating knob, by withdrawing pawl 62ᵈ from engagement with wheel 62ᶜ to permit the "Extras" drum to be manipulated if desired, As soon as the flag is moved into one of the tariff positions the main operating shaft 1 may then be operated by either the time mechanism or the distance mechanism to actuate the main fare register unit A through the medium of the ratchet wheel 11 on the main shaft lever 8, pawl 16 and ratchet 20 of the fare drum unit. The time and distance operating connections for the main shaft 1 will hereafter be more fully referred to.

Assuming that the main fare register unit A and the "Extras" unit B have both given a fare indication and it is desired to reset the fare drums to zero position and also bring the main operating shaft 1 back to its initial position, the flag of the meter is caused to complete its cycle of movement, and nearing the end of its passage through the final quarter of the cycle the resetting instrumentalities for the fare drums are brought into play.

The resetting devices for the main fare register unit A may be best observed from Figures 1, 2 and 3 of the drawings. Briefly, this resetting mechanism includes a train of gears operatively connected with the 10¢ drum T of the unit A, a resetting segment and a clutch device for connecting a pinion operated by the segment with the train of gears to rotate them in such a direction as to impart a reverse movement to the fare drums T, D and D¹⁰.

From Figure 3 it will be observed that the hub 21 of the 10¢ disc T has fitted thereto in addition to the ratchet wheel 20 which operates the unit, a resetting gear 85 adapted to mesh at all times with a companion gear 86 secured to the resetting shaft 87 journaled in the walls 2—2 of the meter frame to freely rotate, and projecting beyond one of the side walls 2 to receive the pinion 88. This pinion 88 meshes with a gear 89 of a clutch unit in such a way that the shaft 87, carrying the gear 86 which meshes with the gear 85, may freely rotate while the pawl 16 is operating to actuate the 10¢ drum of the main fare register unit A through the medium of the ratchet wheel 20. That is to say, the gear 89 is journaled upon a stub shaft 90 mounted in one of the side walls 2 of the meter frame and carries therewith a ratchet wheel 91 adapted to be engaged by the hooked end 92 of a clutch pawl 93 pivotally carried at 94 by the inside face of a carrier disc 95 loosely mounted on the shaft 90. For the purpose of maintaining the hooked end of the pawl 93 in engagement with the teeth of the ratchet wheel 91 a suitable spring 92ᵃ preferably engages the said hooked end of the pawl, as clearly shown in Figures 9 and 10, while the opposite end of said spring is anchored as at 92ᵇ to the carrier disc 95. When the lever 8 and pawl 16 are operating the 10¢ drum T, the gears 85, 86, 88 and 89 will rotate and consequently the ratchet 91 carried by the gear 89 will rotate in a clockwise direction as viewed in Figure 10.

In order to permit the rotation above explained without interference from the pawl 93 the hooked end 92 of said pawl must be held in position to clear the teeth of the ratchet wheel 91 and to that end there is provided a pawl operating lever 96 of substantially T-shaped formation, the end of the shank portion thereof being pivotally supported as at 97 on the side of the meter casing while one end 98 of the head portion thereof engages with the tail of the pawl 93 mounted on the carrier disc 95 to thus hold the hooked end 92 of the pawl clear of the teeth of the ratchet 91. The said portion 98 of the lever 96 is maintained in engagement with the tail of the pawl 93 due to the fact that the opposite side 99 of the head of the lever rides upon the periphery 100 of a controlling cam 101 carried upon the cam shaft C which is directly under the control of the flag shaft F through the intermeshing of the gears F', and R' respectively on the flag shaft and resetting shaft.

When the hired period of the vehicle comes to an end and the operator manipulates the flag to turn the flag shaft F back to its initial position the cam 101 will be rotated in the direction of the arrow in Figure 10 to bring the notch 102 of said cam beneath the end 99 of the lever 96 and thereby permit the same to drop. When the lever 96 returns to its position shown in Figures 1 and 9, the upper edge 98 of the lever releases the tail of the pawl 93 and permits the hooked end 92 thereof to engage with the teeth of the ratchet 91. This engagement of the pawl with the ratchet has the effect of coupling the disk 95 with the gear 89 thereby locking the same together for the purpose of accomplishing the resetting of the fare drums through the medium of the gear 89, pinion 88, resetting shaft 87 and gears 86 and 85.

To effect the desired resetting the said disc 95 carries therewith a resetting pinion 103 adapted to be engaged by a resetting segment 104 pivoted to the side of the meter casing as at 105 and limited in its upward movement by the stop 106. This resetting segment 104 is tensioned by the spring 107 which engages therewith as at 108 and with the casing as at 109 to thereby cause the segment to move downwardly when free from the restraining lever 110 to effect the resetting of the discs. That is to say, the segment 104 is held poised by means of the lifting lever 110, the end 111 of which is slidably guided in the slot 112 in one of the walls 2 of the meter casing and is confined between one of the edges of the segment and the stirrup 113 carried thereby. This lever 110 is pivotally supported as at 114 to the wall 2 of the meter casing opposite the segment and carries at its intermediate portion a depending actuating tooth 115 adapted to be operated by a notched cam disc 116 also carried upon the flag shaft F. The said notched cam wheel 116 and tooth 115 are substantial duplicates of the tooth 82 and the cam 84 of the lifting lever 79 and the said levers 79 and 110 are operated simultaneously therewith by the movement of the flag shaft F. As the flag shaft F is rotated by the shifting of the flag the notched cam wheel 116 rotates and lifts the lever 110 or permits it to fall according to whether the point of the tooth is situated on the periphery of the wheel or about to descend to the bottom of the notch.

When the flag is down and the meter is operating, it will be understood that the resetting mechanism is out of action due to the fact that the cam 101 on the resetting shaft C has elevated the member 96 to cause the pawl 93 to clear the teeth of the ratchet wheel 91 (see Figure 10). Also, since the lever 110 is elevated by reason of the tooth 115 riding on the periphery of the cam wheel 116, the resetting segment 104 will be lifted so that its initial teeth will be in mesh with the resetting pinion 103, while the spring 107 will be expanded to thus place the segment under tension.

When the meter is to be reset and the flag is being brought back to its initial vertical position, the flag shaft F will also be turned to cause the notch in the cam 116 to gradually be brought beneath the tooth 115 on the lever 110. Thus, as the tooth 115 descends into the notch in the cam, the end 111 of the lever 110 will also descend due to the tension of the spring 107 and pull the segment downwardly which will have the effect of causing the teeth of the segment to engage with the pinion 103 to rotate the same and consequently rotate the disk 95 carrying the pinion.

As previously indicated as the flag is returned to an upward position the notch 102 of the cam 101 on the came shaft C permits the member 96 to drop and causes the clutch pawl 93 to connect the disk 95 and the gear 89. In that way the disc 95 and gear 89 are connected so that, as the moving segment 104 engages with the teeth of the pinion 103, the gear 89 will be rotated thus causing the resetting shaft 87 to be moved by means of the pinion 88. Likewise this movement of the shaft 87 will cause gears 85 and 86 to reset the fare drums, T, D and $D^{10}$ through the means provided for that purpose.

When the flag has been moved back to its vertical position at the end of the resetting operation, the segment 104 will remain in a downward position, that is, away from the stop 106, due to the fact that the notch 116 fully receives the tooth 115 of lever 110 when the flag is vertical and the spring 107 exerts its full influence on the segment. In other words, the lever 110 is at the downward limit of its swinging movement so that the end 111 thereof is at its lowermost position when the flag is vertical. However, as soon as the flag is turned 90° to "First tariff," i. e., one-quarter into a new cycle, the tooth 115 of the lever 110 is forced out of the notch on to the periphery of the cam wheel 116 thereby elevating the end 111 of the lever and pushing the segment 104 all the way back against the stop 106. This makes the full length of the rack of the segment available to sweep across the gear 103, on the next resetting operation.

Also, in the resetting operation, the lever 8 which actuates the fare drums is pushed backwardly against the tension of the spring 12 by the kick-out cam 120 on the cam shaft C engaging with a suitable roller abutment 121' on the intermediate portion of the lever 8, as for instance from the position shown in Figure 8 to the position shown in Figure 6.

And, as will further be seen from Figure 8, the dog 121 which engages with the teeth of the ratchet 20 to prevent retrograde movement thereof during the operation of the fare drums is carried by lever 122 that is pivoted as at 123 to swing clear of the teeth of the ratchet, against the tension of the spring 124, upon being engaged by the projection 125 of the disc 126 on the cam shaft C. When the flag is down in one of the tariff positions, as shown in Figure 8, the dog 121 lies against the teeth of the ratchet 20 in such a way as to freely permit the ratchet to move under the advancing influence of the pawl 16, but, as the flag is being moved to an upright position during the resetting operation, the projection 125 engages with the tail of the lever 122 to rock the dog 121 clear of the teeth of the ratchet 20.

As previously indicated, the main operating shaft 1 may be driven by the movement of the vehicle or by suitable clockwork after the hiring period has started.

Accordingly, it will be observed from Figures 2 and 18 that the means for driving the main operating shaft from the wheel of the vehicle may consist of a worm 126 operated through the usual flexible cable 127 geared with the vehicle wheel, whereby the said worm will drive the pinion 128 carried by the shaft 129. This shaft carries therewith gears 130 and 130ª adapted to mesh respectively with suitable intermediate gears 131 and 131ª carired by shears or rocking levers 132 and 132ª respectively, each having an arm portion adapted to be engaged by cams 132ᵇ and 132ᶜ on the cam shaft C to throw either of the gears 131 or 131ª into and out of engagement with a main driving wheel 133 loosely journaled on the main operating shaft 1. The gear 131ª drives wheel 133 when the flag is at the 90° or "First tariff" position, while gear 131 drives the same when the flag is in the 180° or "Second tariff" position.

It will thus be seen, more specifically from Figs. 18 and 19, that the gear 130—130ª on shaft 129 is a compound gear, and that the gear 131 carried by the shear 132 which pivots about an axis coincident with the shaft 129, is always in mesh with gear 130. Likewise 131ª carried by shear 132ª is always in mesh with the smaller gear 130ª. When the flag is in the up or "Vacant" position the cam 132ᵇ comprising the oppositely located sections $x$ and $y$ holds shear member 132ª, and cam 132ᶜ holds shear member 132 in such positions that both gears 131 and 131ª are out of mesh with the gear 133 on the main operating shaft 1. However, when the flag is turned to the 90° position, $x$ of cam 132ᵇ moves out of the way of the nose of the arm 132ª and permits gear 131ª to rock into engagement with gear 133. Meanwhile cam 132ᶜ holds shear 132 in its original position.

If the flag is turned to the 180° position, or "Double tariff" the nose of the shear 132 falls into the notch of cam 132ᶜ and simultaneously the section $y$ of cam 132ᵇ engages the nose of shear 132ª thereby to disconnect gear 131ª from gear 133, while the inward movement of shear 132, due to the notch receiving the nose of the shear, causes gear 131 to mesh with 133 and thus drive the main shaft 1 at a higher speed. It will of course be understood that the shear members 132 and 132ª are drawn toward each other by the spring S.

The said driving wheel 133 is provided with a plurality of spring pressed pawls 134 for engaging with the ratchet disc 135 fast on the main operating shaft 1. Thus, with the arrangement described when the flag is down in one of the tariff positions, the main operating shaft may be driven from the wheel of the vehicle entirely independent of the clockwork.

The clockwork mechanism drives the time shaft 136 which carries the beveled gear 137, and this gear in turn meshes with the beveled gear 138 mounted upon the shaft 139. At one end of the latter shaft is a duplex pinion unit including pinions 140 and 140ª adapted to operate the gear 141, carried by one end of sleeve 142 loosely mounted on the main shaft 1, either through a reduction gear train G or direct through gear 143. The sleeve 142 above referred to is provided with a flange 142ª carrying pawls 144 adapted to engage with the ratchet member 145 rigidly secured to the main shaft 1 by the set screw 146. These pawls 144 and ratchet 145 are arranged with respect to the pawls 134 and ratchet 135 so that the operation of the main shaft 1 by the vehicle wheel will not injure the time mechanism.

The gearing unit G for transmitting motion from the clockwork to the sleeve 142 of the main shaft constitutes one of the novel features of the present invention, since it provides for making the necessary correction or allowance for values in waiting time to meet the requirements of the law in different places with respect to the fee charged for the periods of waiting time. That is to say, a further novel and distinctive feature of the invention resides in the provision of means whereby the passenger is given the benefit of full waiting time irrespective of whether it is during the initial period or subsequently.

Suppose the meter is constructed to operate in units of one-fourth of a mile at 10¢ after the initial charge of 30¢ for the first one-half mile is used up. If the passenger upon hiring the cab starts to travel immediately, he will be carried the distance of one-half mile for the initial charge of 30¢ and then he may require the vehicle to stop and wait. During the period of waiting the meter will register an additional 10¢ over and above the initial charge for each four minutes of waiting time, and therefore in a meter constructed to operate on the basis of one-quarter of a mile for 10¢, the traveling distance of one-quarter mile at 10¢ is the equivalent of four minutes waiting time per 10¢.

In this same example of 30¢ for the first one-half mile and 10¢ for each one-quarter mile thereafter, suppose that as soon as the passenger hires the cab he does not travel but waits for an indefinite period. If the meter were constructed on the basis of four minutes waiting time per 10¢ or traveling a distance of one-quarter mile for 10¢, the passenger would only be given eight minutes waiting time for his initial charge of 30¢, because the clockwork by driving the main shaft direct would move the finger 3 through its idle arc of 120° in that period, and only rotate the cam 11 the distance of two teeth. Thus, the passenger would obtain less value, by waiting, according to the established rate of the meter, than he would by traveling one-half mile, because, as above explained, the initial-charge finger would be set to release the restraining lever 5 after having moved through an arc of 120° which is the equivalent of only two teeth on the cam 11 since each tooth represents the equivalent of one-quarter of a mile in distance traveled and a 10¢ charge therefor.

In some places the law requires that the passenger receive the full benefit in waiting time of his 30¢ initial charge and the present initial time-charge regulating unit including the gearing G is intended to meet that situation. That is to say, instead of the passenger receiving only eight minutes waiting time for his initial charge of 30¢, the law requires that he shall receive twelve minutes waiting time because the unit of value is 10¢ per one-quarter mile or 10¢ for four minutes waiting time.

To accomplish the desired result of giving twelve minutes waiting time for the initial charge of 30¢, the main operating shaft 1 must be moved slower by the time mechanism during the initial charge period than during the subsequent operation of the meter, and to that end the novel unit G is employed.

This unit includes the levers 147 and 147ᵃ respectively for supporting the reduction gearing unit G and the pinion 143 for connecting the time shaft 139 directly with gear 141. As shown in Figure 17, these levers 147 and 147ᵃ are yieldingly drawn toward each other by spring 148 and are held in the proper spaced relation by means of the stop arm 149 carried by lever 147ᵃ engaging with the stud or abutment 150 on the lever 147. By this arrangement the said levers are yieldingly arranged with respect to each other to thereby permit the lever 147 to automatically shift at the proper time to bring the gear train G into operation. That is to say, the lever 147 which carries the gear train G is adapted to be engaged at its upper end by the pin 151 on cam wheel 152 when the flag is in its vertical or "Vacant" position, thereby holding the lever 147 in such a position that the stop 150 cannot rest in the crotch of the arm 149. The cam 161 likewise holds the lever 147ᵃ outwardly so that the gear 143 is out of mesh with the gear 141. When the lever 147 is held in its outward position by means of pin 151, the spring 148 is placed in tension so that immediately upon the shifting of the flag from "Vacant" position toward the "First tariff" or 90° position, the camshaft C will cause cam 152 to rotate in the direction of the arrow and remove pin 151 from engagement with the lever. The cam 161 likewise moves away from engagement with the lever 147ᵃ, but the lever 147ᵃ is held against movement by the pin 157 and lever 156. The contraction of the spring 148 will thereby cause the lever 147 to move inwardly until the stop 150 engages with the end of the arm 149. Thus, the reduction gearing unit G consisting of the gears 153, 154 and 155, in the example shown, may connect the time driven pinion 140ᵃ with the gear 141 as soon as the flag is moved from "Vacant" to "First tariff" position, i. e. at the ¼ turn.

If the vehicle is waiting the gears of the gearing unit G will drive the main shaft 1 for a period of time equivalent to the time it takes the initial-charge fingers 3 to be driven from its original set position to a point where it will engage with the restraining lever 5 to thereby permit the cam wheel 11 to operate on the lever 8 which actuates the fare drums. While the gearing unit in the present example is illustrated as consisting of three pinions for obtaining the proper reduction of speed in the driving of the gear 141 by the gear 140ᵃ, it will of course be understood that the ratio may be varied according to different conditions of use, the essential feature being that suitable reduction gearing is used to produce a slower drive of the main shaft 1 to give the passenger the full equivalent in waiting time for the amount of the initial charge, as compared with what he would receive in actual distance traveled for the same amount subsequent to the initial charge.

As this variation in the waiting time tariff only applies to the initial charge and not to subsequent waiting time, which in the example taken is 10¢ for four minutes, suitable means must be provided to automatically drive the main shaft 1 by the time mechanism, after the time covered by the initial charge period has expired. To that end the direct drive gear 143 carried by the lever 147ᵃ is employed. This gear 143 is always in mesh with the gear 140 which is a part of the duplex unit driven by the time shaft 139, and, for the purpose of holding the said gear 143 out of engagement with the gear 141 while the gearing unit G is in operation suitable temporary restraining means are employed.

The temporary restraining means above referred to consists of lever 156 adapted to engage with projection 157 on lever 147ᵃ, the said projection being held in engagement with the lever due to the tension of the spring 157ᵃ which is connected to the lever 147ᵃ as at 159 and to the frame of the machine as at 160. The said projection 157 engages with the lever 156 until the end of the twelve minute period covered by the initial charge. And, at the expiration of this period the lever 156 is lifted or raised to free the projection 157 by means of a cam projection 158 carried by the main shaft 1 adjacent the gear 141. When the flag is placed in the ¼ turn or "First tariff" position, shown in Figure 17, the gearing unit G is immediately thrown into operaton to connect the time gear 140ᵃ with the gear 141, and, as the said gear 141 and main shaft 1 are rotated by the gearing unit G, the cam projection 158 travels through an arc of substantially 120° and, as it reaches substantially this point of its cycle, it lifts the lever 156 out of engagement with the projection 157 to thereby permit the spring 157ª to pull the lever 147ª inwardly and thus permit the gear 143 to directly connect gears 140 and 141. Simultaneously with the shifting of lever 147ª to connect gears 140 and 141, the lever 147 is rocked outwardly to disengage the pinion 155 of the gear train G from the gear 141 through the medium of the arm 149 and stop 150.

After the gearing unit G has been thrown out of operation, as above explained, the time mechanism will operate the main shaft 1 directly through gears 140, 143 and 141, thereby causing the fare register unit of the meter to register a unit of charge on the face of the meter for each four minutes of waiting time at the same rate as the traveling distance, that is, 10¢ per quarter of a mile.

Referring to Figs. 2, 17 and 20, it will be seen that when the flag is in the "Vacant" position the pin 151 engages the lever 147, and the cam 161 engages the lever 147ª, in which position both of the levers 147 and 147ª are held so that neither the gear 143 nor the gear 155 meshes with the gear 141. The clock cannot, therefore, operate the fare drums when the flag is in the "Vacant" position.

Upon moving the flag to the first tariff or 90° position the pin 151 is rotated away from the nose of the lever 147, and the cam 161 is likewise rotated from under the nose of the lever 147ª. The lever 147 is now free to move inwardly so that the gear 155 meshes with the gear 141, while the lever 147ª is held in the position shown in Fig. 17 by means of the abutment 157 and lever 156 so that the gear 143 is out of mesh with the gear 141. The clock now drives the gear 140ª which drives the gear 141 by means of the gears 153, 154 and 155, the gear 155 being in mesh with the gear 141. When the pin 158 raises the lever 156 the spring 157ª pulls the lever 147ª inwardly, while the arm 149 pushes the lever 147 outwardly so that the gear 155 no longer meshes with the gear 141. The clock now drives the gear 141 through the gears 140 and 143.

Upon moving the flag to the second tariff position, the pin 151 is rotated 180° from the nose of the lever 147, while the cam 161 is rotated 180° from the nose of the lever 147ª. The clock would drive the gear 141 in the second tariff or 180° position in exactly the same manner as was described for the 90° position of the flag.

When the flag is rotated to the 270° position on account of the automobile being delayed through no fault of the passenger and for which the passenger should not be charged, the pin or cam 162 engages with the nose of the lever 147 and disengages the gear 155 from the gear 141, while the cam 161, extending as it does through an arc of more than 90°, engages the nose of the lever 147ª, pushing the said lever outwardly and disengaging the gear 143 from the gear 141. When, therefore, the flag is rotated to the 270° position, either of the gears 155 or 143, which ever one may have been in mesh with the gear 141, is unmeshed therefrom so that the clock cannot drive the gear 141.

When the flag is being rotated from the 270° position to the "Vacant" position, the cam 161 holds the lever 147ª in its outward position so that the pin 157 is engaged by the lever 156, while the cam 151 engages the lever 147 and holds it in its outward position, as heretofore described.

Regardless of whether the flag of the meter is in "First" or "Second tariff" position, that is at the 90° or 180° position, the reduction gearing unit G will function to cover the period of initial waiting time. However, when the flag is turned from the 270° position to zero or "Vacant," a cam 161 on the cam shaft C shifts the lever 147ª so as to disengage the pinion 143 from gear 141 while at the same time the pin 151 on cam 152 engages with the end of lever 147 to rock the gear 155 of the gearing unit G out of mesh with gear 141. Also when the cam shaft is turned to the said 270° position a cam 163 also on the cam shaft C permits lever 164 to drop under the influence of spring 165 and thereby lower the pinion 166 into engagement with the gear 143.

The pinion 166 above referred to is one element of a counter or register operating train for registering "Not recording" minutes, that is the number of minutes that the flag is in the "Not recording" position. This feature of the arrangement does not constitute a part of the initial-charge time regulating unit and the connections therefor are only briefly referred to, to explain their presence in the illustration.

When the flag of the meter is turned from the 270° position back to the vertical or "Vacant" position, the cam 161 engages with the nose of lever 147ª to maintain the gear 143 disengaged from gear 141 while at the same time the cam 163 will lift the lever 164 and raise the gear 166 to a position where it will clear the teeth of gear 143. Also when the flag reaches the vertical position again the projection 151 will engage with the nose of lever 147 to hold it in such a position that the gear 155 of the gear train G is out of mesh with gear 141. Thus, when the flag moves from the 270° position back to zero, the levers, 147 and 147ª are shifted to such positions that all interengaging gears carried thereby will be out of mesh, it being understood however that the gear 143 always meshes with gear 140 and that gear 143 always meshes with gear 140ª. Furthermore, during the movement of the flag from the "Not recording" position or 270° position to zero the main shaft 1 will be reset so as to bring the cam projection 158 thereon back to its original position.

From the foregoing it will be apparent that the initial time charge controlling unit includes a reduction gearing unit for connecting the time shaft and the main shaft, the ratio of the gearing of said reduction unit being such that the cam 158 on the main shaft adjacent to the gear 141 kicks out the lever 156 to release the lever 147ᵃ at the same time that the finger 3 depresses the restraining lever 5 by engaging the point 5ᵃ thereof. In other words the initial time charge regulating unit includes a direct drive gear 143 and reduction gearing G, the former of which is adapted to be automatically connected with the main shaft after the period of time consumed by driving the main shaft through the reduction gearing has expired.

The general operation of the meter is as follows:

When the flag is vertical the main operating shaft 1 is entirely disconnected with the vehicle driven instrumentalities as well as the time mechanism. The fare drums of the main fare registering unit A therefore cannot be operated and the "Extras" fare unit is also locked because the pawl 62ᵈ is in position to engage with the teeth of the wheel 62ᶜ.

However, as soon as the flag is moved from the vertical position to the 90° position, the star wheels 22 are moved into the position shown in Figures 13 and 14 and the gear 131ᵃ (arranged behind gear 131 in Figure 2) connects gear 130ᵃ on the shaft 129 with the gear 133 journaled on the main shaft 1 and adapted to operate the same, when the vehicle is traveling, through the medium of the pawls 134 and ratchet 135. Also when the flag is moved to the said 90° position, the roller 72 is raised out of the valley 71 of the heart-shaped cam 70 and the part 67 engages the tail 66 of the pawl 62ᵈ to release the ratchet wheel of the "Extras" operating instrumentalities (see Figure 4). Further, the end 50 of the lever 47 engages with the teeth 51 of the ratchet which is connected with the "Extras" fare drum 40 thereby to hold the drum in the position to which it is moved through the manipulation of the knob 63 by the operator.

On the "First tariff" and "Second tariff" positions, which are respectively at 90° and 180° positions, the time mechanism is connected to the main shaft 1 through the unit G, as previously described. Therefore, the meter is in condition to be operated either by the movement of the vehicle, or clock-work, as desired.

When the flag is moved into the second tariff or 180° position, the nose of the lever or shear 132 falls into the notch cam 132ᶜ and simultaneously, the section y of the cam 132ᵇ engages the nose of shear 132ᵃ thereby to disconnect gear 131ᵃ from gear 132. The spring S now moves the shear 132 towards the shaft 1 causing gear 131 to mesh with the gear 133 and thus drive the main shaft 1 at a higher rate of speed.

After the main fare register unit A has registered the amount of fare due from the passenger at the end of the trip and the required amount of "Extras," if any, has been registered on the unit B, the flag may be moved to the "Not recording" position which is 270° from the starting point of the flag. After leaving this position the flag may be moved toward the vertical or starting position and near the end of the movement through this arc, the resetting operation takes place. It is thought that in view of the detailed description of the resetting instrumentalities hereinbefore recited, that it will be clear that the resetting operation is effected by the lowering of the segment 104 by the lever 110 and spring 107, whereby the rack portion of the segment engages with the pinion 103 which is suitably coupled with the gear 89 to thereby operate pinion 88 on shaft 87 (see Figures 9 and 10) to turn the shaft 87 which carries the resetting gear 86 that meshes with the resetting gear 85 associated with the 10¢ drum T.

As the lever 47 is rocked on its pivot 49 during the resetting operation, the end 50 thereof is released from engagement with the teeth of the ratchet 51 associated with the "Extras" drum 40 to thereby permit the spring 41 to return the drum to its initial position.

From the foregoing it is thought that the many features and advantages of the invention will be readily apparent. The simplicity of arrangement and working parts enables the meter construction to be standardized so that more or less inexperienced mechanics can easily make repairs and, furthermore, by reason of the novel main operating shaft 1 and the arrangement whereby the finger 3 causes the operation of the fare drums to be restrained for definite periods to cover different initial charge values, makes the meter adaptable to laws in various parts of the country by simply adjusting the position of the finger 3 by releasing the set screw 4 and accurately positioning the same on the shaft.

It will of course be understood that changes in the form, proportion and minor details of construction may be resorted to without departing from the spirit of the invention or scope of the appended claims.

I claim:—

1. A taximeter including a fare register unit consisting of a plurality of fare drums, means for actuating one of the fare drums, a star wheel unit for transferring motion from one fare drum to the other and means consisting of a spring tensioned pivoted frame having a shaft for carrying the star wheels, and the said star wheels having hub portions provided with a flat face, and keeper means supported by the meter frame at one side of the star wheels and adapted to be engaged by the flat face of the hub portion thereof when the star wheel is disengaged from the fare drums.

2. A taximeter including a fare registering unit including a plurality of fare drums, and means for returning said fare drums to their original position consisting of an adjustable stop projection on the side of one fare drum and a pivoted pawl on the side of the adjacent fare drum adapted to be engaged by said stop to effect resetting of the drums, said adjustable stop projection being adjustable to change the initial tariff to any rate desired.

3. A taximeter including a fare registering unit consisting of a plurality of fare drums, and means for returning the drums to their original position consisting of an adjustable stop carried by one fare drum and a pawl carried by the adjacent drum and adapted to be engaged by said stop to effect resetting.

4. A taximeter including a fare registering unit comprising fare drums, adjustable means on the drum of lowest value cooperating with relatively stationary means on an adjacent drum of higher value for adjusting the position of the fare drum for exhibiting the desired figure of the initial charge unit on the face of the meter.

5. A taximeter including a fare register unit comprising fare drums, a yielding abutment carried by one of the drums and occupying a relatively fixed position, and a relatively adjustable abutment carried by an adjacent drum and adapted to engage with said yielding abutment during the resetting operation to effect the proper return of the fare drums to their original position.

6. In a taximeter, fare drums, actuating means therefor, a main shaft, restraining means for preventing said actuating means being operated by the main shaft for a predetermined time, and adjustable means carried by the main shaft of the meter for releasing said restraining means.

7. In a taximeter, fare drums, actuating means therefor, a main shaft, restraining means for preventing said actuating means being operated by the main shaft for a predetermined time, a radially disposed detent finger adjustably mounted on said main shaft of the meter for releasing said restraining means.

8. In a taximeter, a meter frame time and speed controlled mechanism journaled therein, a main shaft driven thereby, fare drums, a lever for operating the said fare drums, restraining means for engaging with said lever, and manually adjustable means carried by one end of said shaft and on the outside of the meter frame for releasing said restraining means.

9. A taximeter including a meter frame time and speed controlled mechanism journaled therein, fare drums, a lever for operating the same, a main shaft driven by the said time and speed controlled mechanism, restraining means for the fare drum operating lever, and readily accessible and adjustable means carried by the main shaft and adapted to release said restraining means.

10. In a taximeter, a fare register unit, drums, elements for determining the initial charge rate including a clock driven dual gear train to drive said drums at either of two speeds, and an adjustable detent finger for varying the operative relation between said elements to vary the value received for the initial charge.

11. A taximeter including a main operating shaft, fare drums, restraining means for preventing initial actuation of the fare drums, and a radially disposed detent carried by said shaft for engaging with and releasing said restraining means.

12. A taximeter including a fare register unit, a fare register operating lever for operating said unit, a main operating shaft, a ratchet wheel carried by said shaft and adapted to operatively engage the lever to thereby actuate the same, a restraining device including an arm carried by the lever and a restraining lever adapted to engage said arm, and a radially disposed detent carried by the main operating shaft and adapted to actuate said restraining lever to release the arm and permit the engagement of the fare drum operating lever with the ratchet on the main operating shaft.

13. A taximeter including side frame members, fare drums, a main shaft driven by time and speed controlled mechanism and having its ends projecting beyond the said frames, a restraining lever for preventing the initial actuation of the fare drums, an adjustable detent carried by one end of the main shaft for releasing the restraining lever and means at the opposite exposed end on the main shaft for resetting the main operating shaft.

14. A taximeter including side frame members, fare drums, a main shaft driven by time and speed controlled mechanism and having its ends projecting beyond the said frames, a restraining lever for preventing the initial actuation of the fare drums, an adjustable detent carried by one end of the main shaft for releasing the restraining lever, a heart-shaped cam on the opposite exposed end of the main shaft, and a resetting lever adapted to engage with said heart-shaped cam.

15. A taximeter including side frames, a main shaft driven by time and speed journaled therein and having its ends projecting beyond the same, an adjustable detent controlling the duration of the initial fare period and carried by one of the exposed ends of the main shaft and an adjustable heart-shaped cam to return said shaft to initial position and carried by the opposite end of the main shaft.

16. A taximeter including fare drums, and resetting means for said fare drums comprising a resetting gear train operatively connected with the drum of lowest value, a clutch device including a gear having a ratchet hub, said gear connecting with said gear train, a spindle independent of the gear train supporting the gear of the clutch device, a disk carried by said spindle, a spring-tensioned pawl carried by the disk and adapted to engage with the ratchet hub of the gear, a pinion carried by the disk, means controlled by the flag for operating said pawl of the clutch device, and a resetting segment also controlled by the flag and engaging with said pinion carried by the disk.

17. A taximeter including fare drums, and resetting means for said fare drums comprising a resetting gear train operatively connected with the drum of lowest value, a clutch device including a gear having a ratchet hub, said gear connecting with said gear train, a spindle independent of the gear train supporting the gear of the clutch device, a disk carried by said spindle, a spring-tensioned pawl carried by the disk and adapted to engage with the ratchet hub of the gear, a pinion carried by the disk, a resetting segment adapted to engage with said pinion, a spring for said segment lever, connections between the segment and the flag, a cam shaft controlled by the flag and having thereon a cam, and a lever controlled by the said cam on the cam shaft for engaging with the pawl of the clutch device between the segment and the resetting gear train to render said clutch device inoperative when the flag is in any of the tariff positions.

18. A taximeter including a flag, fare drums, a resetting shaft having a geared connection with the fare drum of lowest value, a pinion carried by the resetting shaft, a clutch unit engaging with said pinion, means for opening and closing said clutch, a resetting segment controlled by the flag of the meter and means whereby the resetting segment is actuated when the said clutch operating means closes the clutch thereby to actuate the resetting shaft.

19. A taximeter including a flag, fare drums, fare drum actuating means, and means for resetting said fare drums including a resetting gear train, a clutch device interposed in said resetting gear train, means operated by the flag for opening said clutch when the flag is in any of its tariff positions and closing it as the flag moves through the resetting portion of its cycle, and a spring tensioned resetting segment released by the flag after the clutch is closed to thereby actuate said resetting gear train.

20. In a taximeter, fare drums, actuating means therefor, a main shaft, restraining means for preventing said actuating means being operated by the main shaft for a predetermined time, adjustable means carried by the main shaft for releasing said restraining means after said shaft has rotated any desired part of a revolution, and means whereby said fare drums are held against backward rotation.

21. In a taximeter, fare drums, actuating means therefor, a main shaft and a cam shaft, restraining means for preventing said actuating means to be operated by the main shaft for a predetermined time, a detent finger adjustably mounted on said main shaft for releasing said restraining means; means whereby the cam shaft is operated, and means controlled by the said cam shaft to prevent backward rotation of the fare drums.

22. In a taximeter, a main shaft driven by time and speed controlled mechanism, fare drums, a lever for operating the said fare drums restraining means to prevent the actuation of said lever for a predetermined period, adjustable means carried by one end of said shaft for releasing said restraining means, a cam shaft, means whereby said cam shaft is operated, and means controlled by said cam shaft to prevent backward rotation of said fare drums.

23. A taximeter including a fare drum, a lever for operating said fare drum, a main shaft driven by time or speed controlled mechanism, a star wheel thereon for actuating said lever, an arm carried by said lever, a restraining lever, said restraining lever carrying an abutment; the arm on the first mentioned lever being adapted to engage said abutment and to hold the first mentioned lever in inoperative position, and a detent secured to said main shaft and adjustable to any desired position whereby said restaining lever may be moved so as to release said abutment from said arm.

24. A taximeter including fare drums and resetting means for said fare drums, including a resetting gear train operatively connected with the drum of lowest value, a resetting segment, a clutch device interposed between said resetting segment and said gear train, and means whereby said clutch device operatively connects said resetting segment and gear train to reset said drums when the resetting segment is operated, and means whereby said resetting segment is operated.

25. A taximeter including fare drums, resetting means for said fare drums, including a resetting gear train operatively connected with the drum of lowest value, a resetting segment, a clutch device interposed between said resetting segment and said gear train, and means whereby said clutch device operatively connects said resetting segment and gear train to reset said drums when the resetting segment is operated.

26. A taximeter including fare drums, a flag, resetting means for said fare drums comprising a gear train operatively connected with the drum of lowest value, a resetting segment, means whereby said resetting segment is held under tension when the drums are being operated; a clutch device interposed between the said resetting segment and said gear train, means whereby said clutch device governs the resetting of said fare drums by said resetting segment, means whereby said resetting segment exerts its force to reset the drums only when the flag is being brought into its "Vacant" position.

27. A taximeter including fare drums, a flag, resetting means for said fare drums comprising a gear train operatively connected with the drum of lowest value, a resetting segment, means whereby said resetting segment is held under tension when the drums are being operated; a clutch device interposed between the said resetting segment and said gear train, means whereby said clutch device governs the resetting of said fare drums by said resetting segment, means whereby said resetting segment exerts its force to reset the drums only when the flag is being brought into its "Vacant" position, said last mentioned means including a lever operatively connected with said resetting segment, and means whereby the position of said lever is controlled by the position of said flag.

28. A taximeter including fare drums, a resetting segment, means whereby said resetting segment may be placed under tension; a gear train operatively connected with the drum of lowest value, a clutch device interposed between said gear train and resetting segment; a flag, a cam shaft controlled thereby, and means governed by said cam shaft whereby said clutch may be rendered operative or inoperative to transmit the force from the resetting segment to the gear train.

In testimony whereof I hereunto affix my signature.

JULIUS GLUCK.